Patented May 11, 1948

2,441,276

UNITED STATES PATENT OFFICE 2,441,276

POWER TRANSMISSION UNIT

William H. Kuner and Arthur F. Berger, Dayton, Ohio, assignors to The Master Electric Company, Dayton, Ohio, a corporation of Ohio Application February 5, 1944, Serial No. 521,194

22 Claims. (Cl. 74—193)

This invention pertains to power transmission units and more particularly to a variable speed mechanism of the frictional cone and ring type wherein the delivered speed is progressively variable relative to the driving speed throughout an extended range.

The present disclosure is a further development and improvement of the apparatus and mode of operation set forth and described in patent to Heynau, No. 2,199,491, May 7, 1940.

Heretofore variable speed units of the present type have been assembled in a unitary frame or housing of quite complicated design which presented many difficult problems of production both in casting and in machining operations which resulted in considerable loss and breakage. In use the finished unit was subjected to excessive torsional strains which caused misalignment of parts binding and excessive friction. Furthermore the assembly of individual elements were necessarily effected through relatively small openings of the main frame or housing. Some of these were "blind operations" in positions beyond the range of vision of the workman. Hence, they were accomplished only through use of mirrors and were quite delicate, difficult and expensive to effect.

The object of the present invention is to improve the construction as well as the means and mode of operation of variable speed units of the type referred to, whereby they may not only be more economically and easily constructed, and more conveniently assembled, but the parts thereof will be more accessible for inspection and replacement, and be less likely to get out of repair.

A further object of the invention is to provide a self contained assembly of the operating parts wholly independent of the housing or enclosure, and wherein the operating parts are shaped and arranged as to minimize the torque thereon, and facilitate free operation.

A further object of the invention is to provide in an apparatus of the type mentioned an efficient forced feed lubrication system wherein the lubricant is circulated in intimate relation with all working surfaces and is automatically cooled before being returned.

A further object of the invention is to provide adjusting means by which the motive force is applied in a balanced relation with the portion to be moved, thereby maintaining alignment of the parts and obviating torque and strains by which adjustment thereof is retarded.

A further object of the invention is to provide a variable speed transmission unit having the advantageous structural features and inherent meritorious characteristics, and capable of the mode of assembly and operation hereinafter set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is illustrated the preferred, but obviously not necessarily the only form of embodiment of the invention.

Like parts are indicated by similar characters of reference throughout the several views.

The present invention pertains to the adjustable mounting assembly and supporting structure in which the frictional cones and other operating parts are carried, together with its lubricating system and balanced adjusting means, while the variable speed mechanism, which, per se, forms no part of the present invention, is that shown and described in patent to Heynau, No. 2,199,491, of May 7, 1940.

Power is supplied to the unit from a primary or driving shaft 1 which may be the continuation of a motor or engine shaft or may be operatively connected therewith by gears, belt or friction drive means.

Splined upon the shaft 1 for unison rotation is a pair of revoluble sleeves 2 and 3 journaled for unison rotation in corresponding bearings 2' and 3' which also support the shaft 1. The sleeves 2 and 3 are provided with opposed integral conical heads 4 and 5. The sleeve 3 and conical head 5 of such pair are capable of to and fro axial adjustment upon the shaft 1 toward and from the other sleeve 2 and conical head 4 of such pair.

Disposed in parallel spaced relation with the driving or power input shaft 1 is the driven or power delivery shaft 6, upon which are splined for unison rotation two similar sleeves 7 and 8 journaled in corresponding bearings 7' and 8'. Each sleeve 7 and 8 is provided with an integral conical head 9 and 10, respectively arranged in opposed relation at the adjacent ends of the sleeves.

The sleeve 7 and conical head 9 are capable of axial adjustment relative to the opposing sleeve 8 and conical head 10 in addition to their rotation. The axially adjustable members of the respective pairs of conically headed sleeves are disposed in reverse diagonal relation, and are adapted to be moved in unison relative to the opposing members of the respective pairs.

Surrounding the respective pairs of opposing cones 4—5 and 9—10 and frictionally engaging the opposing faces thereof within the V-shaped recess therebetween is a rigid metallic ring 11 which transmits rotary motion from the opposing cones 4 and 5 on the primary or drive shaft 1 to the second pair of opposing cones 9 and 10 on the secondary or driven shaft 6.

The unison adjustment of the axially movable cones of the respective pairs one toward the other away from the opposing member of the pair causes the motion transmitting ring 11 to frictionally engage the respective pairs of cones at greater or less distance from their axes of rotation. By relative adjustment of the cones of the respective pairs, the ring 11 is caused to shift inwardly within the V-shaped space between one pair of cones, and simultaneously shift outwardly within such space between the conical faces of the other pair of cones. As the cones of either pair are caused to approach each other the ring engages the cones farther and farther from their axis of rotation. Conversely as the cones of either pair are separated the engagement of the ring therewith approaches closer to their axis of rotation. Thus the effect is that of inversely gradually changing the effective diameters of driving and driven pulleys, and in the present instance effects a progressive change of the ratio of rotation of the driving and driven shafts 1 and 6.

As thus far described the structure and operation is that described in the Heynau patent aforementioned and, per se, forms no part of the instant invention.

Figures 4, 15:
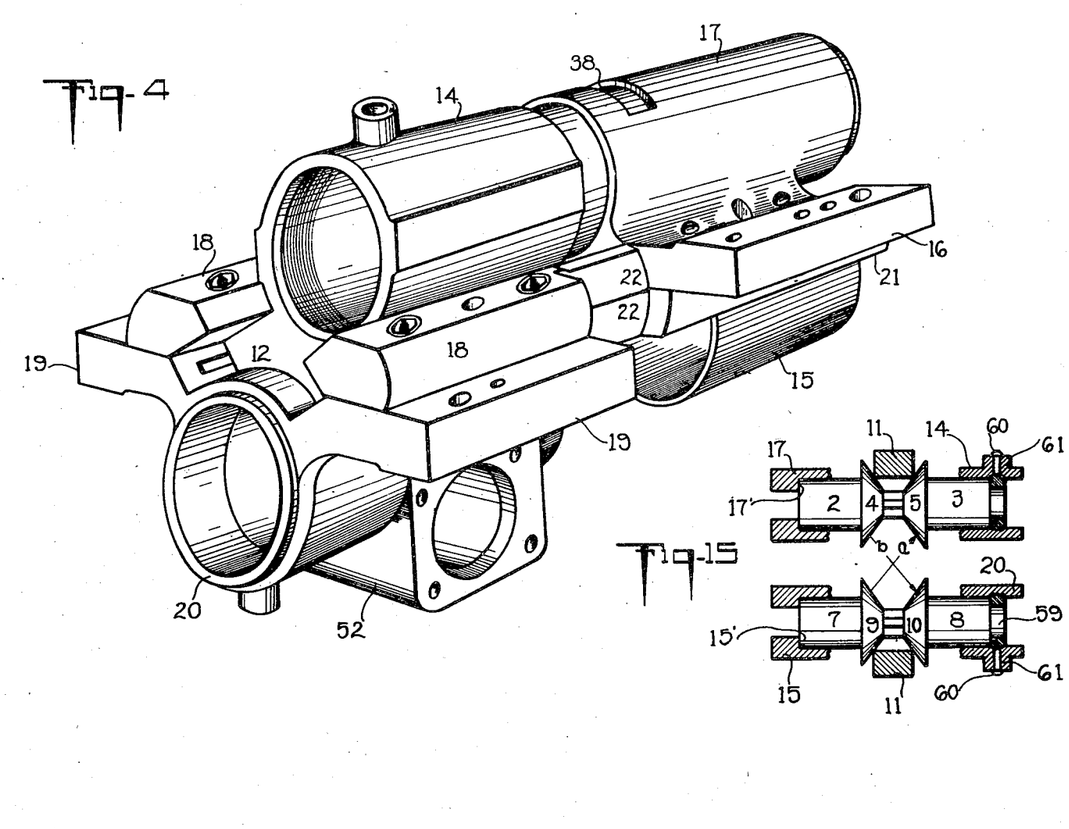
Fig. 4 is a perspective view from the right of Figs. 1 and 2 of the relatively adjustable mounting members for the driving and driven cones which comprise the main frame or supporting structure of the assembly.
Fig. 15 is a diagrammatic view illustrating adjustment of the assembly.
Figure 5:
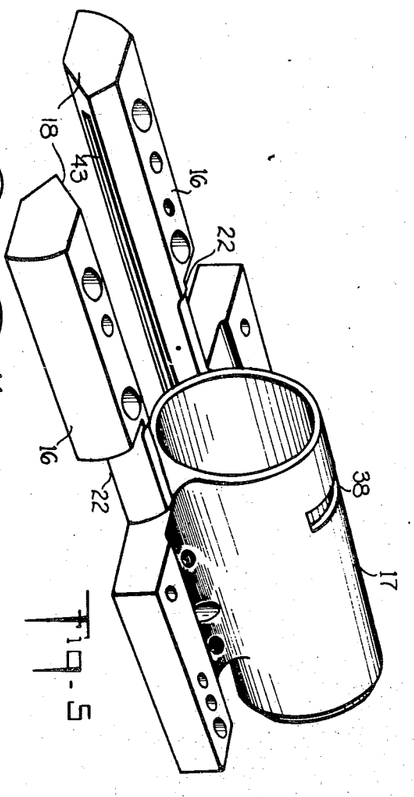
Figs. 5, 6 and 7 are detail perspective views of the mounting and supporting members disassembled.
Figure 6:
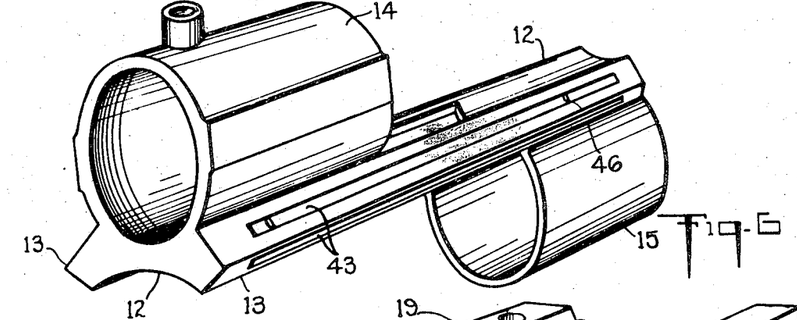
Figure 7:
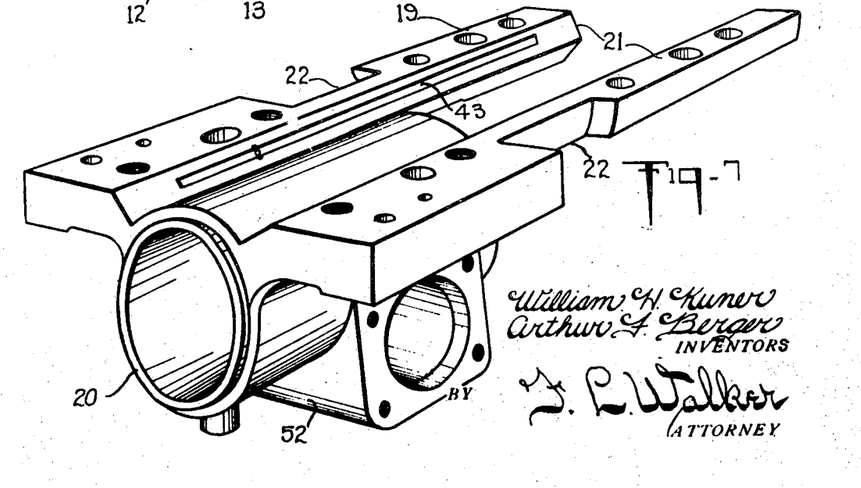
Figure 8:
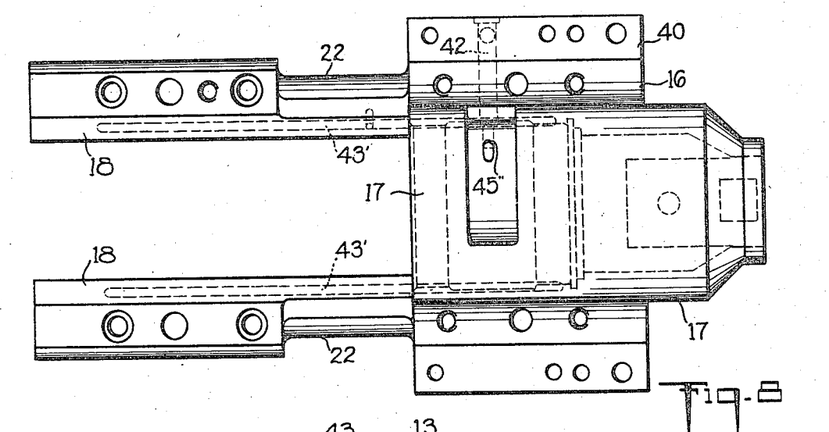
Figs. 8, 9 and 10 are plan views of the members shown in Figs. 5, 6 and 7 illustrating the lubricant distribution ducts therein.
Figures 9, 10:
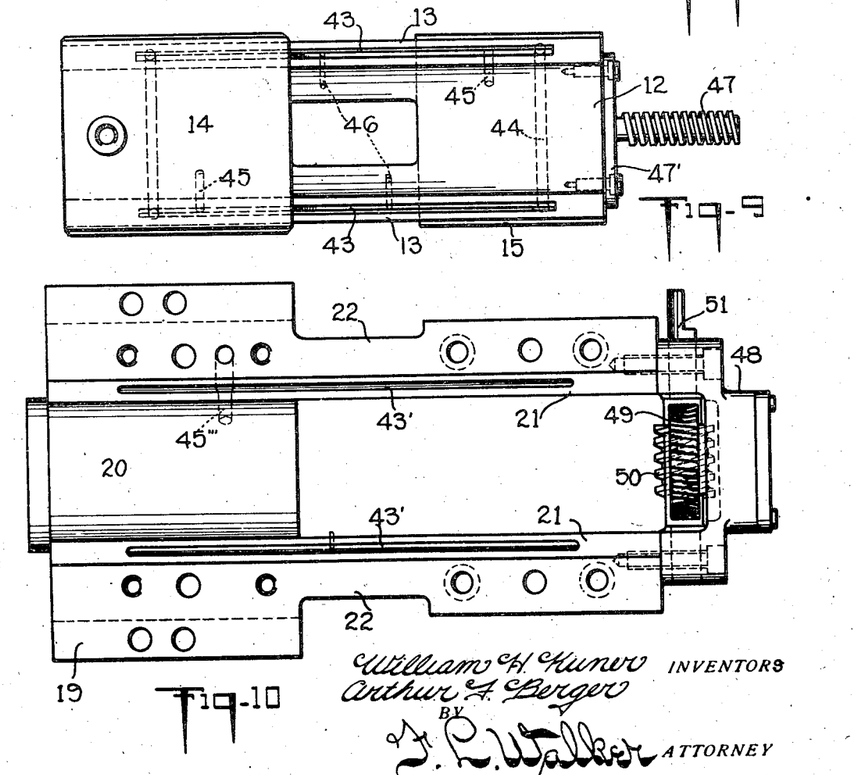
Figure 11:
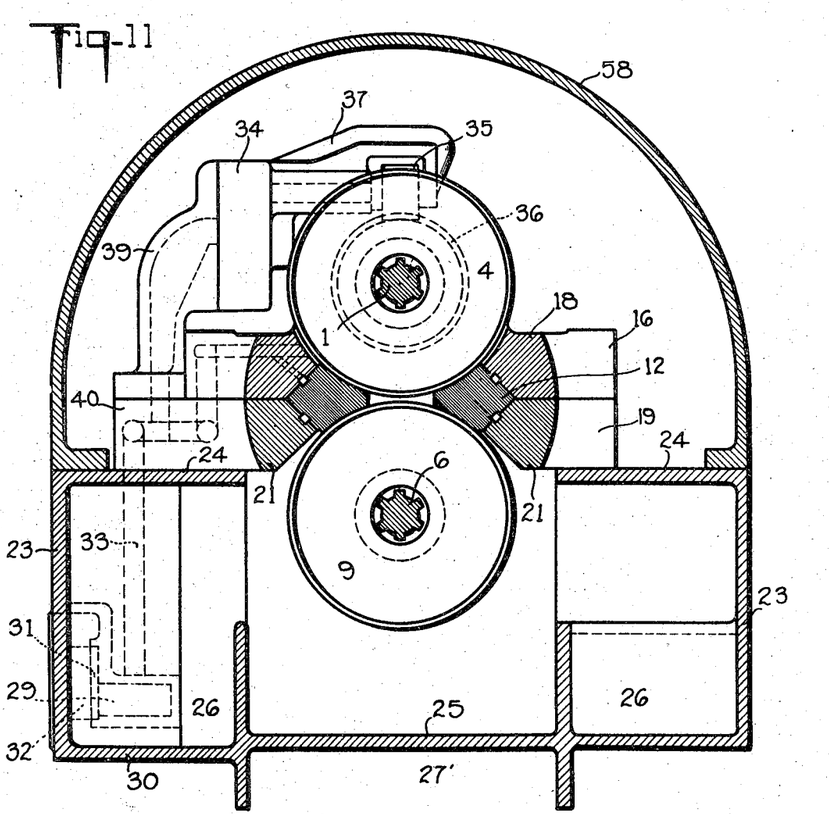
Fig. 11 is a detail view of the lubricant distributing pump and its connections.
Figures 12, 14:
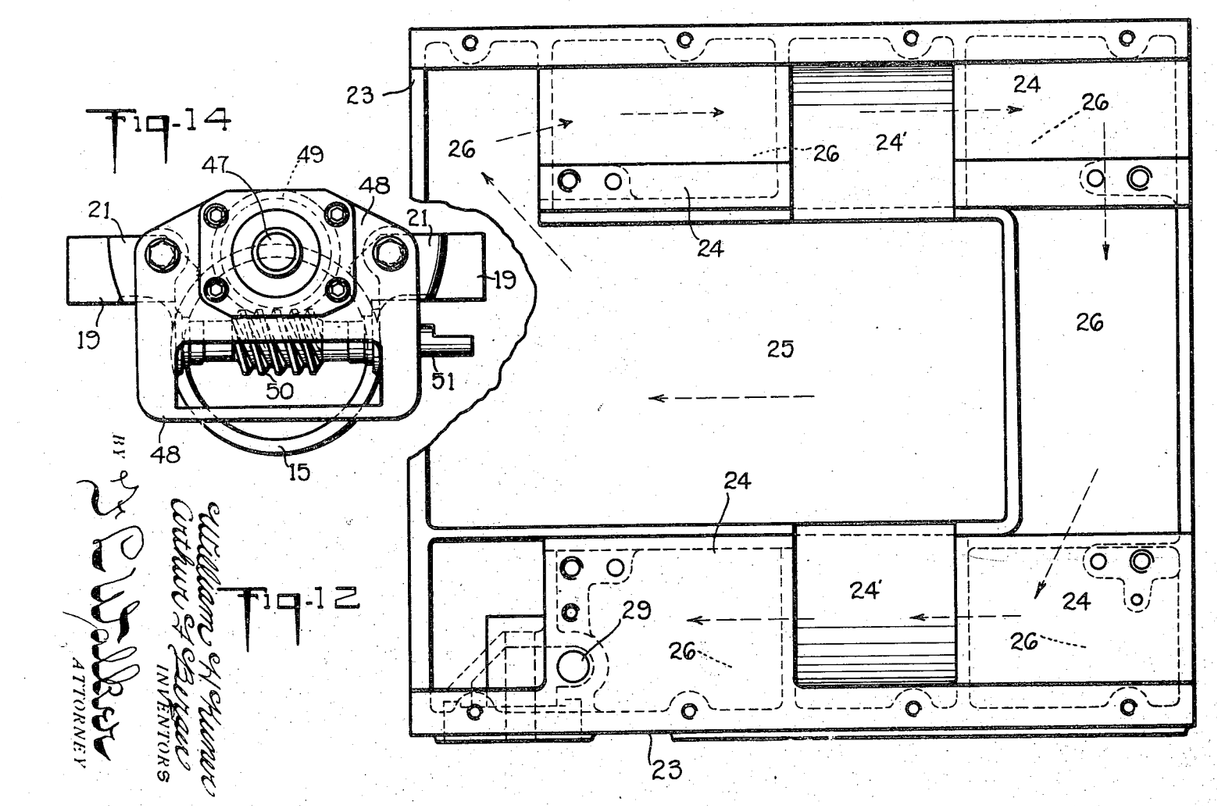
Fig. 12 is a top plan view of the base of the unit disclosing the oil drain pan and circuitous passages to the oil sump.
Fig. 14 is a detail end elevation from the left of Fig. 2.
Figure 13:
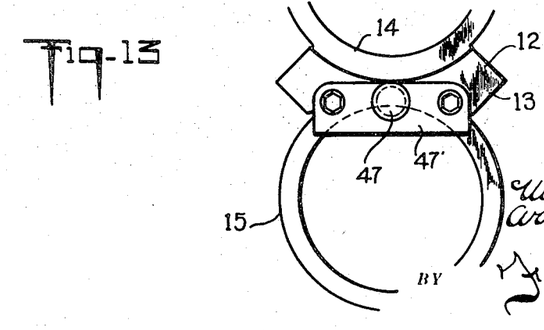
Fig. 13 is a detail end view of the slide member and mounting heads showing connection of the adjusting screw.

To minimize the production problems and expense of manufacture, and obviate the difficulties of assembly, and the effects of torsional strains and deflection of the mount or frame, as heretofore constructed, and assure smooth and easy operation of the unit, there has been devised an improved frame or mounting for the variable speed mechanism before described, which is best illustrated in Fig. 4, and the component parts of which appear in Figs. 5, 6 and 7.

Inasmuch as the axially adjustable sleeves and cones move in unison, there is provided a single unitary slide member 12, the margins 13 of which are of V shape to fit corresponding guide ways in a complementary member. The slide 12 carries on opposite sides of its opposite ends cylindrical mounting heads or barrels 14 and 15. The upper head 14 receives the bearings 3' and sleeve 3 journaled therein. The lower head 15 at the opposite end of the slide 12 receives the bearings 7' of the revoluble sleeve 7. By to and fro movement of the slide 12 the sleeves 3 and 7 and their opposing cones 5 and 9 are moved to and fro in unison. The slide 12 being of sturdy construction, will not bend or twist under torsional strain.

The reciprocatory slide 12 carrying the mounting heads 14 and 15 for the respective axially adjustable sleeves and cones 4—5 and 7—9 respectively, is mounted in stationary guides or ways which for convenience of manufacture are made in separable portions.

One guide member 16 shown in Fig. 5 comprises a cylindrical head or barrel 17 to receive the bearings 2' and revoluble conical headed sleeve 2 journaled therein. From the mounting head or barrel 17 there projects a pair of parallel spaced beveled arms 18 which form the upper sides of the guide ways for sliding engagement of the beveled margins 13 of the slide 12. The slide 12 is concave on its upper and lower faces to clear the stationary mounting heads 17 and 20 as the slide is reciprocated relative thereto.

In Fig. 7 is shown the complementary stationary member 19 which includes a cylindrical head or barrel 20 to receive the bearings 8' in which is journaled the conical headed revoluble sleeve 8. Projecting in an axial direction from the cylindrical head 20 is a pair of beveled arms 21. The members 16 and 19 are disposed one on top of the other in reverse relation and are fixedly connected with each other with the slide 12 therebetween. The arrangement is such that when so assembled the cylindrical head or barrel 17 is at the top of one end of the stationary guide 16—19 in axial alignment with the mounting head 14 of the slide 12, and the head or barrel 20 is disposed at the lower side of the opposite end of the guides or ways 16—19 in axial alignment with the mounting head 15 of the reciprocatory slide 12.

The guide arms 18 and 21 of the respective members 16 and 19 are marginally notched at 22 to afford clearance for the frictional transmission ring 11, in the final assembly.

The assembly of the members 16 and 19, Figs. 5 and 7, in superposed reverse relation with the reciprocatory slide 12, Fig. 6, therebetween is stationarily mounted on a base 23 which has at each side ledges 24 upon which the guides or ways 18—21 rest. The supporting ledges 24 are recessed at 24' in registry with the marginal notches 22 to afford clearance for the transmission ring 11.

Within the base 23, intermediate the supporting ledges 24 is a drain pan 25 for drainage oil. The bottom of the oil drain compartment is in an elevated inclined position. Communicating with the drain pan 25, and passing entirely around the drainage compartment contiguous to the side walls of the base is a passage way 26 the bottom of which is progressively inclined.

The elevation of the bottom of the drain pan provides beneath its inclined bottom an air channel 27 through which air is delivered from a blower fan 28 on the primary shaft 1, thence through the chanel 27' beneath the drain pan and intermediate the lateral passages 26 for cooling the returned oil. At the end of the circuitous passage 26 is an oil sump 29 which communicates with the oil passage 26 of the base through a port 30. Between the port 30 and the interior of the sump 29 is interposed a replaceable filter pad 31 which is accessible through a lateral opening in the side wall of the base, and closed by a glass 32, through which the condition of the oil may be observed.

In an apparatus of the instant type the problem of lubrication is highly important, and is vitally important to the successful and satisfactory operation of the device. In the present construction a circulatory lubricant pressure system provides continuous lubrication under pressure for all moving parts.

Oil is drawn from the sump 29 through the supply passage 33 formed in the wall of the sump, which is integral with the base, by a rotary oil pump 34. The oil pump may be of any suitable detail construction. That heretofore employed is of the conventional intermeshing gear type, and is actuated from the rotary sleeve 2 of the conical head 4 by a small spiral gear pinion 35 which meshes with a peripheral spiral gear 36 upon the exterior of the rotary sleeve 2. The gear pinion is carried by a pump shaft mounted in an overhanging cantilever mounting arm 37 overhanging the mounting head or barrel through an opening 38 in which the gear pinion 35 projects into engagement with the gear 36 upon the rotating sleeve 2. The pump is supported upon a bracket arm 39 having therein suction and discharge passages leading to and from the rotary pump 34. The pump bracket 39 is mounted on a valve block 40 which in turn is supported upon a ledge of the base immediately above the sump 29. Oil thus drawn from the sump past a suction valve in the block 40 is returned to the valve block and forced under pressure through a discharge valve into a passage 42 in the upper stationary mounting member. The guide arms of way 18 are provided in their adjacent faces with lubricant channels 43'.

The beveled bearing surfaces 13 of the slide 12 are provided with longitudinal lubricant grooves 43 which register with like grooves 43' in the engaged beveled bearing surfaces of the arms 18 and 21 of the mounting members 16 and 19 to conjointly form longitudinal oil ducts intermediate the bearing surfaces of the slide and the guides or ways in which it reciprocates. The primary oil supply passage 42 from the oil pump valve block 40 communicates with one of these oil ducts 43—43' and also with a pressure operated relief valve through which excess oil is returned to the drain pan. A transverse passage passage 44 in the reciprocatory slide 12 connects the oil duct 43—43' in the bearing surfaces at one side of the slide with that at the opposite side of the slide 12. Branch passages 45, 45', 45'' and 45''' connect one or the other of the passages 43—43' and 44 with the interior of the mounting heads or barrels 14, 15, 17 and 20 through which lubricant is supplied to the sleeve bearings 2', 3', 7', and 8' therein. Small branch passages having pin hole ports 46 in the face of the slide 12 intermediate the heads 14 and 15, direct small jets of oil upon the faces of the cones and on the ring 11. Thus the various bearing surfaces are continually bathed in lubricant under pressure, including not only the slide bearings but also the sleeve bearings in the respective mounting heads or barrels, and the faces of the conical heads which are engaged by the transmission ring As heretofore constructed the adjusting force necessary to relatively adjust the cones of the respective pairs, has been applied, usually, to the exterior of one of the movable mounting heads which was interconnected in offset relation with the companion movable head. Such application of force in radially offset relation with the axis of the movable interconnected heads introduced an angular component which caused a deflection or "cocking" of the movable mounting head for one or the other of the axially adjustable sleeves and cones. The resulting torque and strain not only caused misalignment of the sleeves and cones of the respective pairs, with resulting inaccuracies, and excessive wear, but in time the deflection became so extreme that the adjustment of the parts was prevented. By applying the adjusting force in an axially aligned relation with the slide 12, such difficulty is entirely eliminated.

The mounting heads 14 and 15 for the axially adjustable sleeves 2 and 3 and the cones 4 and 10, being integral with the slide 12, are maintained in exactly parallel relation by the engagement of the bearing surfaces 13 of the slide 12 with the bearing arms 18 and 21 of the stationary supporting members 16 and 19. By applying the adjusting influence in a direction parallel with the axes of the respective mounting heads 14 and 15 in a medial plane therebetween, a balanced condition is achieved. There is then no tendency for assumption of an askew relation of the mounting heads and the rotary sleeves and cones, and the shafts 1 and 6 are relieved of bending stress and strain.

For purposes of effecting such aligned adjustment, there is attached to one end of the reciprocatory slide 12 a plate 47' from which projects a screw 47 having a coarse thread and a moderately long pitch. The screw 47 is fixed in coincidental relation with the geometric axis of the slide and reciprocates in unison therewith.

Secured to the extremity of the stationary member 19 is a supporting bracket 48 in which is rotatively mounted a worm gear pinion or spiral gear 49 which is screw threaded upon the adjusting screw 47 and functions as a nut thereon. The spiral or worm gear pinion 49 meshes with a cooperating worm, or a companion spiral gear 50 on an adjusting shaft 51 journaled in the supporting bracket 48 and extending to the exterior of the unit where it carries a hand wheel 51', by which the shaft and worm gear may be rotated to axially adjust the screw and with it the reciprocatory slide 12. The relative adjustment of the shaft 51 and hence the ratio of rotation of the shafts 1 and 6 due to such adjustment may be indicated by a mark or pointer upon the hand wheel. However, the relative fluctuations of speed of the driven shaft 6 are preferably indicated by a conventional tachometer for which a mounting portion 52 is shown formed upon the stationary supporting member 19 contiguous to the mounting head 20. For operating the tachometer at the commensurate speed of the driven shaft 6, the instrument is actuated from the revoluble sleeve 8, which is provided with a peripheral spiral gear 53, similar to the gear 36 of the sleeve 2, which intermeshes with a corresponding gear pinion 54 upon the tachometer shaft 55.

The assembled unit as heretofore described which is self contained and the various parts accessible, is finally enclosed in a casing which includes end plates 56 and 57 attached to the base 23, and provided with openings for the shafts 1 and 6.

Figure 1:
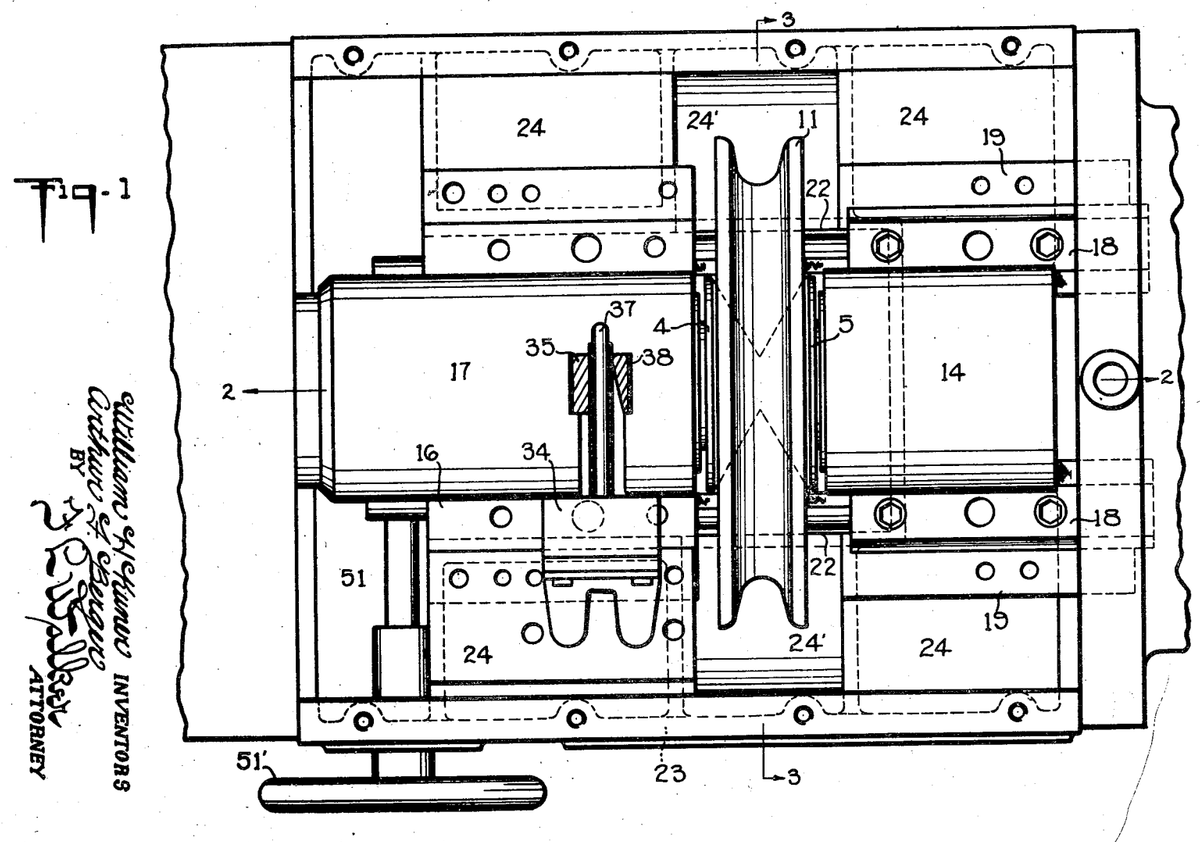
Fig. 1 is a top plan view of an assembled variable speed unit in which the present invention is embodied.
Figure 2:
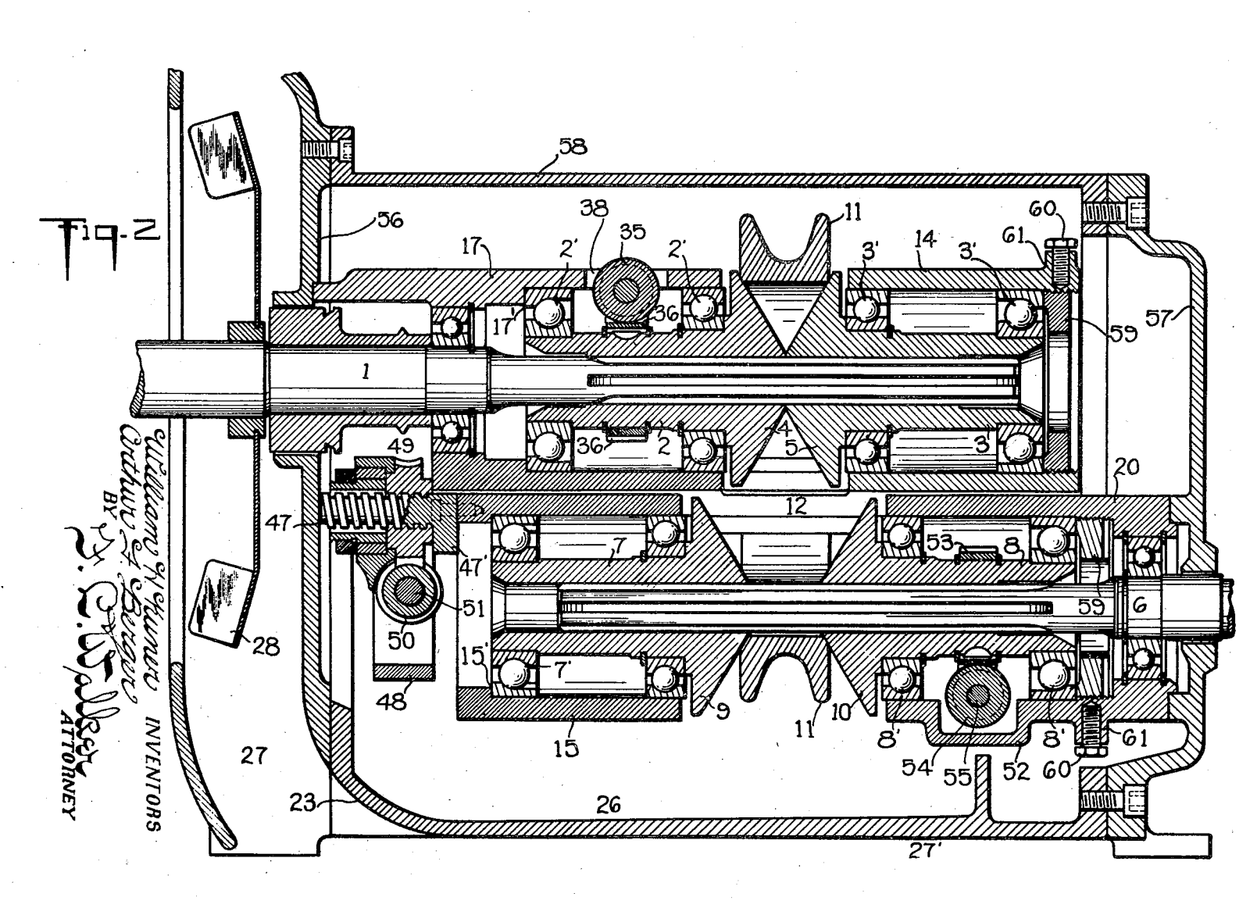
Fig. 2 is a longitudinal sectional view thereof on line 2—2 of Fig. 1.
Figure 3:
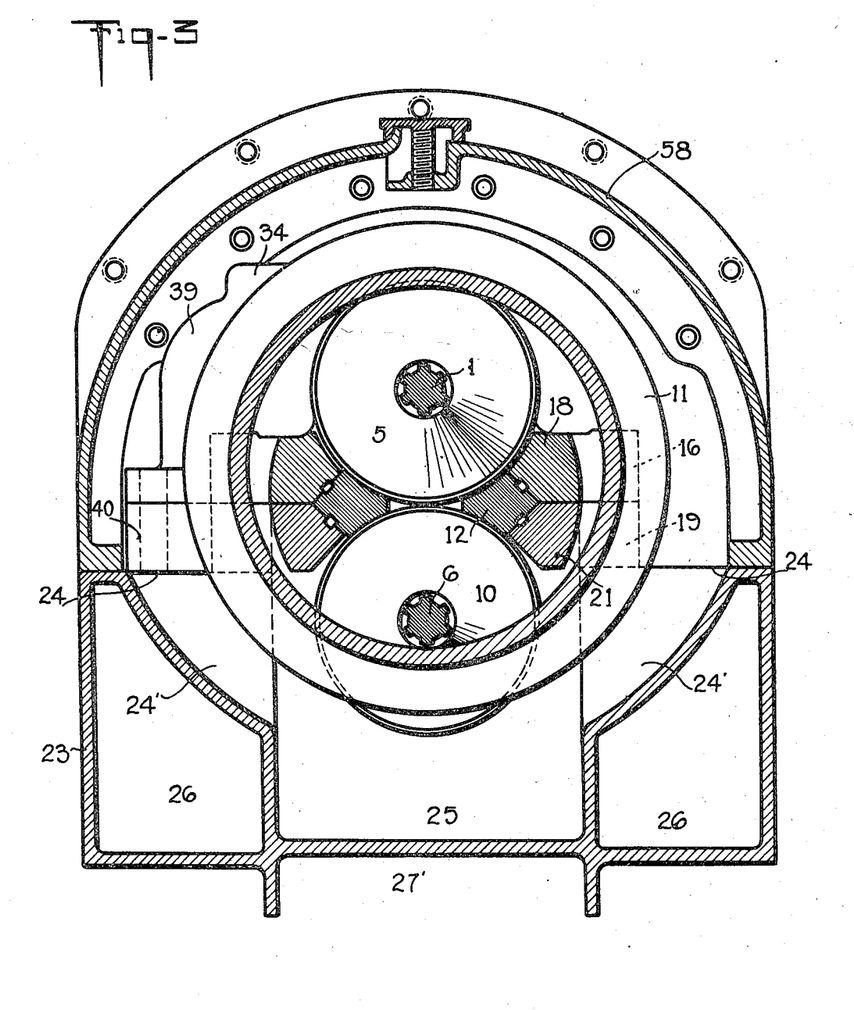
Fig. 3 is a transverse sectional view on line 3—3 of Fig. 1.

The end plate 57 may, if desired, comprise a portion of the end bell or head of a driving motor. Between the end plates 56 and 57 is placed a semicylindrical dome cover 58, which rests on the side walls of the base 23 as shown in Fig. 3 and is further attached to the end plates as in Fig. 2.

All stresses and power applications occur within the periphery of the power transmission ring 11 and independently of the housing or enclosure.

In assembly of the unit for efficient and accurate operation, it is necessary that the transmission ring 11 rotate in a plane perpendicular to the axes of rotation of the respective cones 4—5 and 9—10.

In such relation, when the ring is in neutral position, that is having equal drive engagement with both pairs of shafts whereby the driving and driven shafts 1 and 6 will revolve at the same rate of rotation, the diagonally disposed cones, that is the relatively fixed cones 4 and 10 and the reciprocatory cones 5 and 9 will be equally spaced, as indicated in the diagrammatic view Fig. 15, whereby the dimensions $a$ and $b$ therebetween are equal. For convenience of assembly the bearings of the cones are initially adjusted with the cones in such relation, as determined by a suitable gage introduced between the cone faces having the accurately determined dimensions $a$ and $b$, Fig. 15.

The outer ends of the cone mounting barrels 14 and 20 pertaining to the cones 5 and 10 are internally screw threaded to receive thrust collars 59 which bear against the outer faces of the cone bearings 3' and 8'. The bearings 2' and 7' of the cones 4 and 9 abut tightly against internal shoulders 17' and 15', respectively within their mounting barrels 17 and 15, which definitely locate the cones 4 and 9 relative to their mounting barrels. To locate the opposing cones 5 and 10 in proper relation therewith, the thrust collars 59 are adjusted to minutely change the relation of the cones 5 and 10 relative to their mounting barrels 14 and 20 until by an interposed gage the intermediate equalized spacing $a$ and $b$, Fig. 15, is accurately determined. Thereupon the adjusting thrust collars are secured in their finally adjusted relation by set screws or lock studs 60 mounted in bosses 61 which project exteriorly from the mounting barrels 14 and 20. Such arrangement greatly facilitates the assembly of the unit and its final adjustment into accurate relation of the operating parts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A variable speed unit of the type wherein relatively spaced pairs of cones mounted on driving and driven shafts are interconnected for unison rotation at variable speed ratios, by a motion transmitting element engageable with the cones at different distances from their axes of rotation incident to axial adjustment of at least one cone of each pair thereof, a pair of stationary longitudinally spaced unaligned parallel mounts for revoluble cones of the respective pairs, longitudinally projecting guide bearings associated with each mount, a reciprocatory slide mounted in said guide bearings for to and fro reciprocatory adjustment, longitudinally spaced unaligned parallel mounts for the axially adjustable revoluble cones of the respective pairs, carried by the slide in axially aligned relation with the stationary mounts and an adjusting device operatively connected with the slide intermediate the aligned pairs of cone mounts and in a plane common to the axes thereof.

2. A variable speed power transmission unit of the type wherein a power transmission element is progressively engageable with pairs of driving and driven cones at different distances from their axes of rotation by axial adjustment of at least one cone of each pair, to change the speed ratio of driving and driven shafts upon which the cones are carried, including a reciprocatory slide, integral cone mountings thereon for the inversely axially adjustable cones of the respective pairs, separable mountings for the complementary cones of each pair, guide ways for the reciprocatory slide integral with the mountings for said complementary cones of the respective pairs, and adjusting means in longitudinal alignment with the axis of the slide for shifting said slide and integral mountings for the axially adjustable cones in the guide ways relative to the mountings for the complementary cones integral with the guide ways.

3. A variable speed power transmission unit of the type wherein a power transmission element is progressively engageable with pairs of driving and driven cones at different distances from their axes of rotation by axial adjustment of at least one cone of each pair, to change the speed ratio of driving and driven shafts upon which the cones are carried, including a unitary reciprocatory slide member, integral mountings on opposite sides of the opposite ends of the unitary slide for the axially adjustable cones of the respective pairs, a pair of stationary guide members, a mounting integral with each guide member for one of the stationary cones of each pair thereof, said guide members being assembled in superposed reverse position with the aforementioned slide therebetween with the integral mounts for the stationary cones disposed on opposite sides of the opposite ends of the superposed guides with each mount in aligned relation with one of the cone mounts carried by the slide, and adjusting means in a plane common to the axes of the cone mountings for moving the slide relative to the guide members.

4. A variable speed unit of the type wherein relatively spaced pairs of driving and driven cones are interconnected for unison rotation at variable speed ratios by a motion transmission element engageable with the driving and driven cones at different distances from their axes of rotation incident to axial adjustment of at least one cone of each pair thereof, including a unitary mount for the movable cones comprising an adjustable slide and integral mounting heads thereon movable therewith for the respective axially adjustable cones located at opposite sides of the opposite ends of the slide, a stationary support on which the slide is mounted for to and fro adjustment, stationary mounts on said support for other cones of said pairs in aligned relation with the movable cone mounts on the slide, and adjusting means exerting its influence upon the slide in a plane common to the axes of the movable mounts.

5. An adjustable element for a variable speed unit of the type wherein relatively spaced driving and driven cones upon spaced parallel driving and driven shafts are rotated in unison at variable speed ratios by a motion transmitting member engageable with the driving and driven cones at different distances from their axes of rotation incident to axial adjustment of at least one cone of each pair, comprising a unitary slide and unaligned mounts for the axially adjustable cones integral with said slide on opposite sides of opposite ends of the slide and adjusting means for the slide associated therewith in a plane common to the axes of the unaligned mounts.

6. A variable speed unit of the type wherein relatively spaced pairs of cones mounted on driving and driven shafts are interconnected for unison rotation at variable speed ratios by a motion transmitting element engageable with the cones at different distances from their axes of rotation incident to axial adjustment of at least one cone of each pair thereof, including reciprocal unaligned mounts for the axially movable cones and adjusting means therefor exerting adjusting influence thereon in a plane common to the axes of the cones.

7. A variable speed unit of the type wherein relatively spaced pairs of cones mounted on driving and driven shafts are interconnected for unison rotation at variable speed ratios, by a motion transmitting element engageable with the cones at different distances from their axes of rotation incident to axial adjustment of at least one cone of each pair thereof, including a reciprocatory slide, unaligned mountings for the axially adjustable cones carried by the slide on the opposite sides of the slide, and adjusting means exerting its influence upon the axis of the slide in relatively equalized relation with the unaligned cone mountings.

8. A variable speed unit of the type wherein relatively spaced pairs of cones mounted on driving and driven shafts are interconnected for unison rotation at variable speed ratios, by a motion transmitting element engageable with the cones at different distances from their axes of rotation incident to axial adjustment of at least one cone of each pair thereof, including reciprocal unaligned mountings for the axially movable cones, guide means common thereto in laterally offset relation with the axes of the respective cone mountings, and adjusting means therefor exerting its influence substantially centrally of the plane of said guide means to move the cones.

9. A variable speed unit of the type wherein relatively spaced pairs of cones mounted on driving and driven shafts are interconnected for unison rotation at variable speed ratios, by a motion transmitting element engageable with the cones at different distances from their axes of rotation incident to axial adjustment of at least one cone of each pair thereof, including a pair of reciprocatory mounts for the axially adjustable cones disposed in parallel unaligned relation, a rigid connector between the cone mounts to which the mounts are rigidly attached, and adjusting means therefore exerting its influence directly upon the connector intermediate the axes of the cone mounts and in a plane common thereto.

10. A variable speed unit of the type wherein relatively spaced pairs of cones mounted on driving and driven shafts are interconnected for unison rotation at variable speed ratios, by a motion transmitting element engageable with the cones at different distances from their axes of rotation incident to axial adjustment of at least one cone of each pair thereof, including a pair of parallel unaligned stationary mounts for revoluble cones, and integral laterally offset arms on each of the respective mounts extending toward and into overlapping relation with the arm of the other of said mounts fixedly and rigidly connecting said mounts with each other.

11. A variable speed unit wherein relatively spaced pairs of cones mounted on driving and driven shafts are interconnected for unison rotation at variable speed ratios by a motion transmission element common to the cones and engageable therewith at variable distances from their axes of rotation, incident to axial adjustment of at least a part of the cones, characterized by a circuitous lubricating system, including a lubricant pump actuated by the rotation of one of the cones, lubricant delivery passages leading thence to the several bearings of the unit, a drain pan in which the spent lubricant is collected, a lubricant sump therein with which the lubricant pump communicates and from which lubricant is supplied thereto.

12. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, including reciprocatory slide bearing surfaces upon which a part of the cones are adjustable toward and from other cones, lubricant channels in at least a portion of the slide bearing surfaces, a lubricant pump actuated in unison with the rotation of the cones for supplying lubricant under pressure to the said lubricant channels, branch passages from said channels supplying lubricant to the cone bearings and to the common motion transmission element, a collecting pan for spent lubricant, a sump therein with which the lubricant pump communicates and from which lubricant is supplied to the pump, the whole forming a repetitious cyclic lubricating system.

13. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, characterized by a pressure lubricating system for the unit including a lubricant pump for circulating lubricant under pressure to the several bearings of the unit, a base upon which the unit is supported, a drain compartment therein to receive excess and spent lubricant, an oil sump in said base in which the drain lubricant collects for return to the pump, a circulatory passage connecting the drain pan and sump, and cooling means for subjecting the returned lubricant in said drain pan and passage to cooling influence prior to its return from the sump to the pump.

14. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, characterized by a lubricating system for circulation of lubricant to the several bearings of the unit, including a lubricant pump actuated by rotation of one of the cones, a base upon which the unit is supported, an inclined centrally disposed drain compartment therein for collection of excess and spent lubricant, an inclined drain passage extending exteriorly of the drain compartment and communicating therewith, a lubricant sump with which the lubricant drain passage communicates and from which the lubricant pump is supplied, an air passage beneath the bottom of the drain compartment contiguous to at least a portion of the lubricant drain passage, and a blower directing a current of air through the air passage for cooling the lubricant during its flow through the drain compartment and drain passage prior to its return to the pump.

15. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, characterized by a lubricating system for the unit, including a base upon which the unit is mounted, a centrally disposed drain compartment therein having an inclined bottom, a drain passage also having an inclined bottom marginally disposed relative to the drain compartment and communicating therewith, a lubricant sump to which lubricant is conveyed through the passage from the drain compartment to the sump for return to the lubricating system, and cooling means for cooling the lubricant prior to its return to said lubricating system.

16. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, characterized by a lubricating system for the unit, including a base upon which the unit is mounted, a drain compartment in said base for collection of excess and spent lubricant, and a cooling means for reducing the temperature of the lubricant preparatory to its return to the lubricating system.

17. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, including a stationary mounting upon which one revoluble cone of each pair is mounted, and a reciprocatory mounting common to the other revoluble cones of the respective pairs slidingly engaged within the stationary mounting, and actuating means therefor for moving one cone of each pair relative to the other cone of the said pair, said actuating means being in a common plane with the axes of the revoluble cones.

18. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, including a stationary mount for a part of the revoluble cones, a unitary movable mount common to the remainder of the cones mounted for bodily adjustment of the cones carried thereby relative to those supported on the stationary mount, and adjusting means therefor associated with the movable mount in substantial alignment with the longitudinal axis thereof.

19. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, a stationary mount for part of said cones, an adjustable mount for the remainder of the cones, and actuating means for the adjustable mount exerting its influence thereon in a plane substantially coincident with the axes of the cones pertaining to the respective mounts, whereby deflection of any portion of said cones relative to others thereof will be minimized.

20. A variable speed unit wherein relatively spaced pairs of cones mounted on driving and driven shafts are interconnected for unison rotation at variable speed ratios by a motion transmitting element common to the cones and engageable therewith at different distances from their axes of rotation incident to axial adjustment of at least a part of the cones relative to other cones, and wherein two of said cones are mounted in fixed bearings, and two of said cones are mounted for movement toward and from the cones mounted in said fixed bearings, including a unitary carrier for the movable bearings of said two cones, bearing mountings on said carrier in fixed relation with other each, and movable in unison, and axially disposed actuating means for moving the carrier.

21. A variable speed power transmission unit of the type wherein a power transmission element is progressively engageable with pairs of driving and driven cones at different distances from their axes of rotation by axial adjustment of at least one cone of each pair, to change the speed ratio of driving and driven shafts upon which the cones are carried, including a reciprocatory slide having integral mountings thereon for the axially adjustable cones, separable mountings for the stationary cones, guide ways for the reciprocatory slide integral with the separable mountings, a base upon which the guide ways are mounted in reverse superposed relation with the reciprocatory slide supported therebetween, lubricant channels in the contacting surfaces of the slide and guide ways, branch passages therefrom supplying lubricant to the several cone mountings and power transmission element, a drain compartment in the base to receive excess and spent lubricant therefrom, a sump in the base in which the excess and spent lubricant is collected, a circulatory cooling passage interconnecting the drain compartment and sump, and a lubricant pump actuated by one of the cones for supplying lubricant under pressure from the sump to the lubricant channels.

22. A variable speed power transmission unit of the type wherein a power transmission element is progressively engageable with pairs of driving and driven cones at different distances from their axes of rotation by axial adjustment of at least one cone of each pair, to change the speed ratio of driving and driven shafts upon which the cones are carried, including a reciprocatory slide having integral mountings thereon for the axially adjustable cones, separable mountings for the stationary cones, guide ways for the reciprocatory slide integral with the separable mountings, adjusting means for the slide carried by the guide ways and exerting its influence upon the axis of the slide, a multi-sectional base upon which the guide ways are mounted in reverse superposed relation with the reciprocatory slide supported therebetween, lubricant channels in the contacting surfaces of the slide and guide ways so arranged that communication therebetween will be maintained throughout the range of adjustment of the slide relative to the guide ways, branch passages therefrom extending through said slide and guideways supplying lubricant to the several cone mountings and power transmission element, one of said passages including a pressure relief valve, an inclined drain compartment in the base to receive excess and spent lubricant, cooling means therefor actuated by the drive shaft of the unit, a lubricant sump in the base in which the excess and spent lubricant is collected, and inclined lubricant drain passage interconnecting the drain compartment and sump through which the excess and spent lubricant is transferred to the sump under influence of gravity, and a lubricant pump actuated by one of the cones for supplying lubricant under pressure from the sump to the lubricant channels for discharge therefrom.

WILLIAM H. KUNER.
ARTHUR F. BERGER.

REFERENCES CITED

The following references are of record in the file of this patent:

UNITED STATES PATENTS

| Number | Name | Date |
|---|---|---|
| 1,564,742 | Acker | Dec. 8, 1925 |
| 2,032,015 | Heynau | Feb. 25, 1936 |
| 2,334,720 | Marsh | Nov. 23, 1943 |

FOREIGN PATENTS

| Number | Country | Date |
|---|---|---|
| 411,834 | Great Britain | June 7, 1934 |
| 576,888 | Germany | May 18, 1933 |